Sept. 11, 1956  R. CLADE  2,762,601
BALL VALVE
Filed April 25, 1952  2 Sheets-Sheet 1
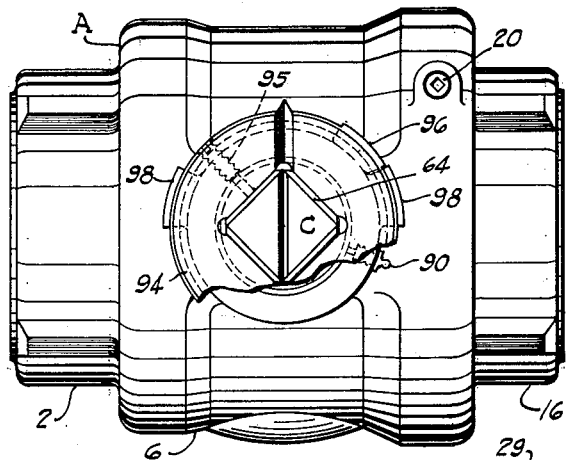
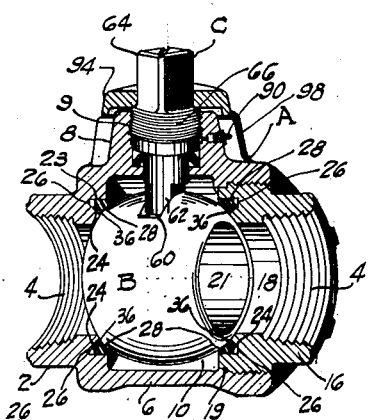
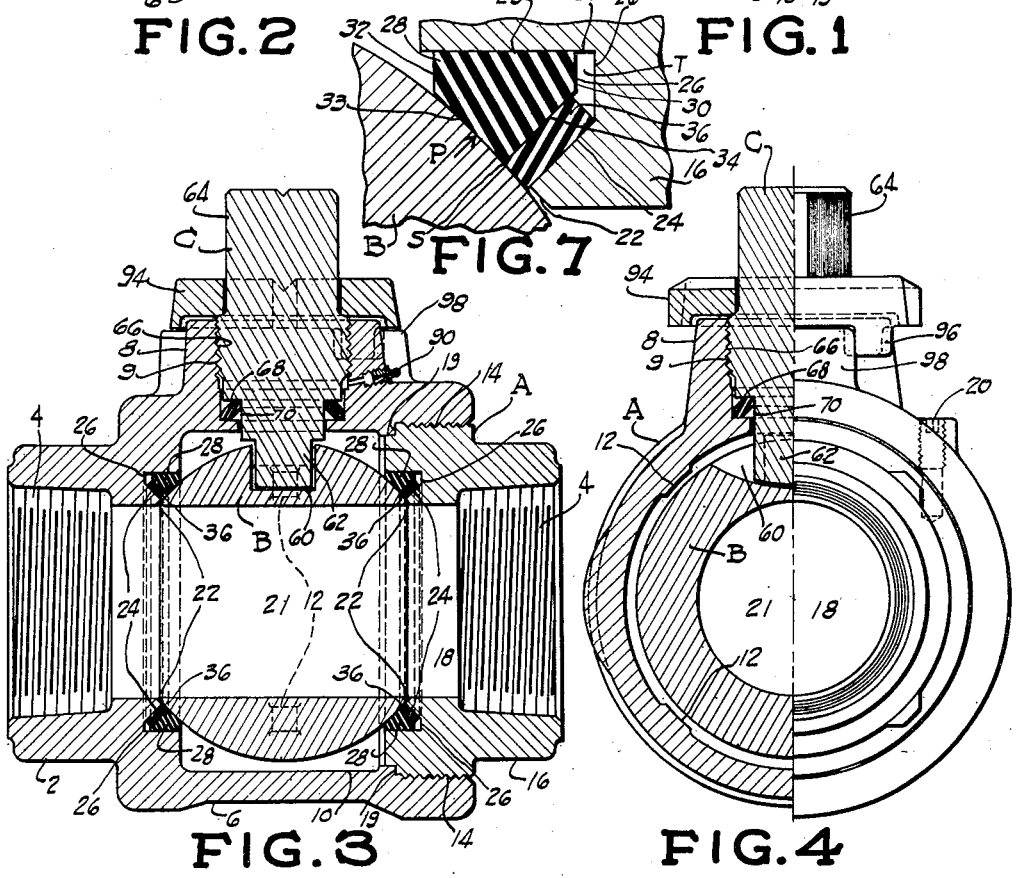
INVENTOR
ROBERT CLADE
ATTORNEY Sept. 11, 1956
R. CLADE
2,762,601
BALL VALVE
Filed April 25, 1952
2 Sheets-Sheet 2
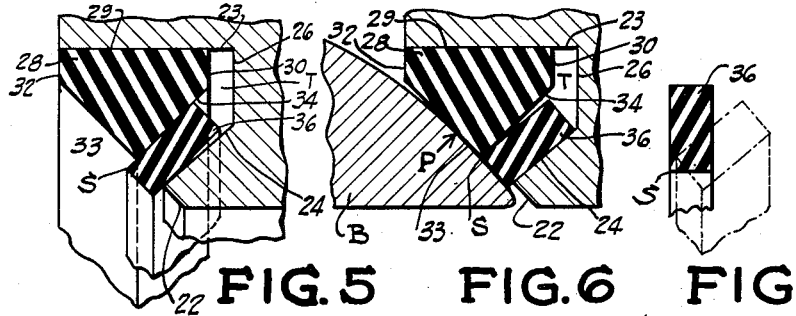
FIG. 5    FIG. 6    FIG. 8
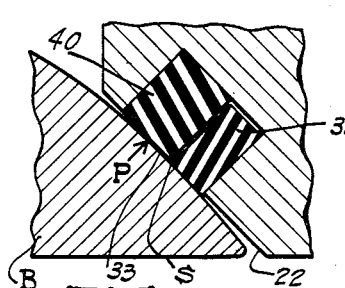   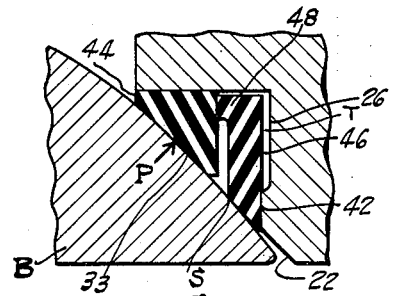
FIG. 9    FIG. 10
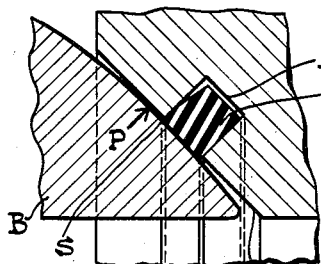   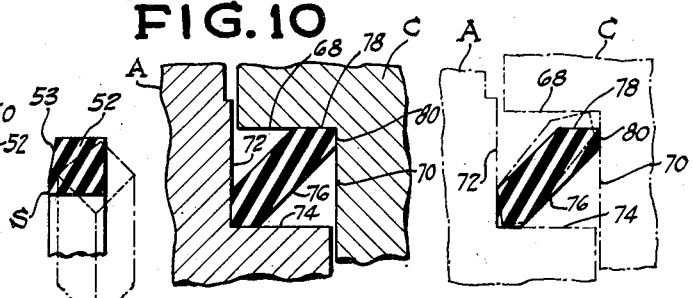
FIG. 11    FIG. 12    FIG. 13    FIG. 14
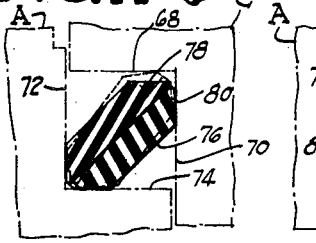   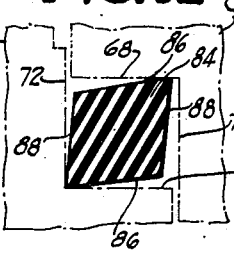   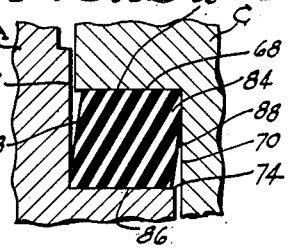
FIG. 15    FIG. 16    FIG. 17
INVENTOR
ROBERT CLADE
BY
Robert A. Shields
ATTORNEY United States Patent Office 2,762,601
Patented Sept. 11, 1956

2,762,601

BALL VALVE

Robert Clade, Detroit, Mich., assignor, by mesne assignments, to W-K-M Manufacturing Company, Inc., a corporation of Delaware Application April 25, 1952, Serial No. 284,390

12 Claims. (Cl. 251—172)

This invention relates to valves in general, but in particular to valves of the spherical or ball type having substantially chemically inert seals. In recent years there has been tremendous increase in the handling of corrosive materials in either the cold or hot condition. It has been almost impossible to so construct present valves as to handle these materials without leakage, yet leakage cannot be permitted due to the danger to operators. It is an object therefore of the present invention to provide a valve having the seat and sealing members formed of a substantially inert material.

A further object of the invention is the provision of a valve of the ball type having the sealing elements made of polytetrafluoroethylene, portions of which are prestressed to effect the seal.

A still further object of the invention is the provision of a ball valve having floating seat and seal rings mutually interacting to seal against leakage.

A yet further object of the invention is the provision of a ball valve utilizing sealing material having an elastic memory and with the material so disposed as to constantly contact the ball.

These and other objects of the invention will be apparent to persons skilled in the art from a study of the following description and accompanying drawings, in which Fig. 1 is a perspective view of substantially one-half the valve;

Fig. 2 is a plan view with certain parts broken away;

Fig. 3 is a sectional view taken substantially through the longitudinal center plane;

Fig. 4 is partially an end view and partially a sectional view taken substantially at the transverse center line;

Fig. 5 is an enlarged detail of the sealing arrangement prior to insertion of the ball;

Fig. 6 is an enlarged sectional view showing the sealing elements with the ball inserted;

Fig. 7 is a detail view showing the relation of the elements when the valve is under pressure;

Fig. 8 is a detail of the sealing ring as formed and as distorted;

Fig. 9 is an enlarged detail similar to Fig. 6, but showing a modification;

Fig. 10 is a detail view similar to Fig. 6, but showing a still further modification;

Fig. 11 is an enlarged detail similar to Fig. 6, but showing a still further modification;

Fig. 12 is a detail of the sealing element of Fig. 11;

Figs. 13 and 14 are enlarged detail views of the neck seal shown in Figs. 1 to 4;

Fig. 15 is an enlarged detail similar to Figs. 13 and 14, but showing a modification; and Figs. 16 and 17 are enlarged details similar to Figs. 13 and 14, but disclosing a still further modification.

Referring now to the drawings in detail, it will be seen that the valve is formed with a body part A, ball or sphere B, and operating stem C. As shown, the body part is made of two parts, one of which is of general cup shape, having a base portion 2 internally threaded, as at 4, to receive the connecting pipeline. Instead of being threaded, this portion may be flanged where desired for attachment to the flanged fitting. From the base portion the cup is enlarged, as at 6, and is provided with a boss 8 adapted to be bored and threaded, as at 9, to receive the stem C. The cavity 10 of the cup portion is preferably provided with a plurality of bosses 12 adapted to help support the ball in its proper position. The inner surface of these boss members will, of course, be finished so as to clear or lightly engage the ball member when in its proper position. The top portion of the cup is internally threaded, as at 14, to receive corresponding external threads of the closure 16. Closure 16 is internally threaded to receive the connecting pipeline and it, as well as the base portion 2, is bored out to provide a through passage 18. The cup member is provided inwardly of threads 14 with a shoulder 19 against which the closure 16 may be jammed to effectively prevent leakage past threads 14. In order to prevent accidental removal of closure 16, the cup portion 6 is drilled and tapped to receive a locking stud 20 projecting into a drilled hole in closure 16, all as clearly shown in Figs. 2 and 4. It is to be noted that the stud 20 is so arranged as to act substantially in compression to resist any rotation of closure 16.

The closure member 16 and the internal ledge of cup 6 adjacent the base are machined, as at 22, on any suitable angle. As shown, this angle is approximately 45 degrees with respect to the longitudinal axis of the valve passageway and forms a seating surface of truncated conical form. This machined portion 22 is tangent to the surface of the ball at the point of pressure, and, where possible, this point of pressure is preferably located at an angle of 45 degrees with respect to the longitudinal axis of the valve passageway. In other words, the point of pressure is a circle formed by the intersection of two opposed cones, one having an apex at the ball center and the other located on the axis of the passageway in spaced relation to the ball. As clearly shown in Figs. 1 to 6 inclusive, the machined seat 22 is interrupted by a groove of generally truncated V cross-section, and this groove is formed by an outer wall 23 preferably parallel to the longitudinal axis of the passageway and by an inner wall 24 preferably parallel to the 45 degree line of pressure previously referred to. Groove walls 23 and 24 terminate in a bottom wall 26 located substantially normal to the longitudinal axis of the valve passageway.

Seating rings 28 are formed preferably of polytetrafluoroethylene, which is a substantially chemically inert material usable for temperatures up to 425 degrees F., and are shaped to have a back wall 29, base wall 30, inner wall 32, and a ball seating surface 33 formed parallel with the machined surface 22 of the body members. The seating surface 33 and base 30 are joined by a wall 34 which substantially parallels the groove wall 24 and is normally spaced therefrom. This seating ring closely fits, but is slidable in the truncated V grooves and may be readily inserted and removed.

The sealing ring 36 is also preferably made of polytetrafluoroethylene and is substantially rectangular in cross-section, having been either initially formed in this shape, as shown in full lines in Fig. 8, or cut from a tube of polytetrafluoroethylene. This annular sealing ring is then twisted to form what might be termed a conical annulus; that is, it is twisted to the line and dot position of Fig. 8. In this position it may be inserted into the space between the groove wall 24 and seat ring wall 34. In actual assembly, of course, the seal ring will be first inserted into the truncated V grooves and then the seating ring inserted. Due to the distortion of the seal ring from a flat annulus to a conical annulus, internal stresses are set up which, with the material polytetrafluoroethylene, will always tend to return the seal ring to its original position; that is, to the full line position of Fig. 8. This returning tendency or memory of the material will insure that the corners S or portions of the inner wall adjacent the corners will be urged into contact with the ball B. This restoring tendency of the seal ring will, prior to the insertion of the ball, cause a space to exist between the ring inner wall and the groove wall 24 (Fig. 5). However, when the ball is inserted and the seat ring 28 moved into its position, the inner wall of the seal ring will engage the groove wall 24, as shown in Fig. 6. This is due to the stretching of the sealing ring and the bringing of its inner surface to be tangent with the ball surface. In this condition, as shown in Fig. 6, there is a space between seat ring wall 34 and the outer wall of the seal ring. This space is in direct communication with space T bounded by the seating ring and sealing ring, and by the base of the truncated V groove. When pressure is applied to the ball, the ball will shift in the body moving the seat ring to the position shown in Fig. 7. In this position the space between the seat and sealing rings is closed due to the slight flow of the material, and this closing of the space, coupled with the shift of the seat ring, will cause compression of the material in space T. This compressed material, be it liquid or gaseous, will tend to push the seal ring toward the ball, thereby assisting in the prevention of leakage. It is obvious that the higher the pressure at the point P, which is the center of load application to the seat ring, the higher will be the sealing effect of the seal ring. When the pressures are low, the parts will be in the position shown in Fig. 6, but the seal ring is under tension and, due to its memory, constantly holds the corners S in contact with the ball, thereby preventing leakage, even at very low pressures. As is obvious from Fig. 8, the application of leakage fluid pressure to the point S of the dot and line position of the seal ring will tend to move the ring to its original position, but to do so would place proportional tensile strains in the ring. From the preceding it will be seen that the ball seats on and is pressure sealed by a chemically inert material, such as polytetrafluoroethylene, and, accordingly, the body and the ball being out of metallic contact, can be made of stainless steel or any other desired material capable of resisting corrosion, yet which cannot be used in rubbing contact due to galling.

While the truncated V groove passageway described is preferred, due to its ease of machining, tests have shown that the groove may be of rectangular cross-section, as shown in Fig. 9. In this case, the side walls of the groove are substantially parallel with the radial line from the ball center to the point of pressure P. In this case the seat ring 40 is rectangular in cross-section and is normally bottomed in the groove and has its outer face tangent to the ball at the point of pressure. In other words, it is parallel to the machined metal surface 22. The seal ring is identical in formation and application to that previously described, and hence the same reference numerals are applied. Here again the seal ring will be under tension, and the bulging of the seating ring under high pressure will effectively block any leakage between the rings and will increase the pressure of the sealing ring on the ball.

In Fig. 10 the groove of Figs. 1 to 7 has been modified and in this case the base wall 26 is extended and provided with an annular boss 42 extending toward the ball and adjacent the machined surface 22. In this form the seating ring 44 is of substantially right triangular cross-section, having its hypotenuse tangent to the ball at the point of pressure P. The sealing ring 46 is generally L shape in cross-section, having one leg 48 adapted to contact the wall of seating ring 44, and the other leg contacting the surface of the ball adjacent the boss 42. In this form when pressure is applied to the ball, the seating ring 44 will shift and through leg 48 cause compression of the material in the space behind the sealing ring. This compressed material will tend to resist the distortion of the sealing ring and will assist the rotating forces in applying pressure to the ball at the sealing point S. In this form, like those previously described, the initial seal is by distortion of the sealing ring, and the higher the pressure, the greater the hugging tendency of the seal ring on the ball.

In cases where non-corrosive materials are handled and non-galling metals may be used, the ball may be seated directly on the machined surface 22, as shown in Fig. 11. In order to seal the valve, a groove 50 is cut interrupting the seating surface 22 outwardly of the point of pressure; that is, between the point of pressure and the passage 18. This groove is cut like that described in connection with Fig. 9, but of smaller cross-section. The sealing ring 52 is formed as shown in Fig. 12 and is of substantially square cross-section, with the exception that one wall is relieved, as at 53, so as to assist in the insertion of the ring into the groove. This sealing ring 52, like sealing ring 36, is rotated to the line and dash position and will, due to its memory and locked up stresses, tend to rotate in a counterclockwise direction, thereby causing the corners S to closely engage the ball surface. This sealing ring will, prior to insertion of the ball, project slightly inward of the machined surface 22 as does the sealing ring of Fig. 5. Accordingly, the ball will stretch the sealing ring and this tension, coupled with the rotating tendency, will effectively seal against leakage.

As clearly shown in the figures, the ball B previously referred to is made as a true sphere with a passageway 21 extending therethrough and adapted to be lined up with or disposed at right angles to passage 18. The point of juncture between passage 21 and the ball surface will, of course, be relieved to prevent breakage of the sharp corners and to permit ready passage past the seating and sealing elements. A portion of the ball is grooved, as at 60, to receive the lower end 62 of the stem C. This stem is formed with a square or other shaped operating end 64 inwardly of which it is threaded, as at 66, for engagement with corresponding threads formed internally of boss 8. Intermediate the threads and the ball engaging portion the stem is provided with a shoulder portion formed by a bottom wall 68 and the cylindrical portion 70 of the stem. A corresponding shoulder is formed below the threads of the boss and is formed by an outer wall 72 and a bottom wall 74. These shoulder portions, as clearly shown, are spaced and adapted to receive a sealing element such as shown in Figs. 13 to 17 inclusive. As shown in Figs. 1, 3, 4, 13 and 14, the sealing element is a conical annulus having a cross-section of parallelogram form. As shown, this annulus is formed with parallel side walls 76 and a pair of end walls 78 and 80. This sealing ring is formed in its unstressed position to the line and dash outline of Fig. 14 and when it is inserted between the shoulders of the body and stem, the points of intersection between walls 78 and 80 will engage the shoulder 68 of the stem and the wall 74 of the body. As the stem is screwed downwardly to its final position, the conical annulus will be distorted to its full line position in which it forms a strut extending diagonally between the corners of the shoulders of the stem and body. The walls 78 and 80 will be in close engagement with the walls 68 and 70 respectively of the stem and with the walls 72 and 74 respectively of the body. The memory of the material, which is preferably polytetrafluoroethylene, will constantly urge the material into contact with the shoulders and it will effectively follow the shoulders during the 90 degree rotation of the stem, which is necessary to open or close the valve. Any pressure leaking into the body between the ball and body will be blocked by the sealing member with the pressure tending to wedge the conical annulus into the gap between the stem and body.

Under certain circumstances it may be desirable to form the annular stem sealing rings in two parts, and this may be done as shown in Fig. 15, but since the action is the same and the sealing surfaces are the same, the same reference numerals have been applied as used in connection with Figs. 13 and 14.

Where extremely high pressures are to be sealed, it may be desirable to use the conical annulus having a rhomboidal cross-section, as shown in Figs. 16 and 17. In this form the sealing ring 84 is formed with parallel upper and lower walls 86 and inner and outer parallel walls 88. In the unstressed condition of the conical annulus shown in Fig. 16, the outer corner is in engagement with the corner formed by the intersection of walls 72 and 74 of the body, while the upper corner is in engagement with the wall 68 of the stem. Movement of the stem downwardly to its normal position will distort the material into the form shown in Fig. 17. Any pressure tending to leak past the stem will be effectively blocked and the material will follow the stem due to the pressure and to the internal stresses locked in the material by its distortion during assembly.

In order to reduce wear on the threads between the stem and body boss, a lubricant fitting 90 may be provided whereby lubricant may be introduced into the space between the stem and body and between the stem seal and the threads. In order to limit the motion of the valve to 90 degrees, a cap 94 is dropped over the upper end of the stem and locked into position by any suitable means, such as the stud 95 (Fig. 2). This cap is provided with a downward projection 96 adapted to be engaged by the body stops 98. In this way the valve is effectively limited to 90 degrees rotation, whereby the ball may be moved between open and closed positions.

From the preceding it will be seen that line leakage is effectively prevented irrespective of the direction of pressure application by floating seat and seal rings, and that in all cases the seal ring is normally formed in one shape, and distorted during application to another shape, so that the material of the sealing ring will constantly tend to restore the ring to its normal condition, and this restoring tendency will constantly cause the ring to closely engage the ball. In addition to this, each seal ring is placed under tension due to the tendency of the ball to be moved through the ring by the pressure. With certain of the rings the floating seat and seal rings mutually interact to resist movement of the ball and seal against leakage. It will also be seen that the seal at the stem is also formed by material distorted during application to the valve and following the slight vertical movements of the stem during opening and closing of the valve. In all cases the leakage pressure, if any, tends to tighten the seal, and in all cases the restoring tendency or memory of the material holds the material in close contact with the metallic parts to institute the seal.

While the invention has been described more or less in detail with specific reference to the drawings, it will be obvious that various modifications and re-arrangements may be made, and all such modifications and re-arrangements are contemplated as will fall within the scope of the following claims defining my invention.

What is claimed is:

1. In a spherical plug valve the combination of a valve body, a body flow passage for the movement of matter through the body, a truncated conical surface formed on the body surrounding the flow passage, a plug rotatable in said body and having a flow passage therethrough, a substantially spherical seat formed on said plug, an annular groove interrupting said conical surface at the point of tangency between said plug and conical surface, a seating ring in said groove and shiftable axially of the body flow passage, a truncated conical seating surface formed on said ring substantially parallel to said body conical surface, and a sealing ring in said groove between said seating ring and the adjacent body flow passage, said sealing ring being shiftable in said groove through contact with said plug to tension the sealing ring against said plug.

2. In a spherical plug valve the combination of a valve body, a body flow passage for the movement of matter through the body, a truncated conical surface formed on the body surrounding the flow passage, a plug rotatable in said body and having a flow passage therethrough, a substantially spherical seat formed on said plug, an annular groove interrupting said conical surface at the point of tangency between said plug and conical surface, a seating ring in said groove and shiftable axially of the body flow passage, a truncated conical seating surface formed on said ring substantially parallel to said body conical surface, and a sealing ring in said groove between said seating ring and the adjacent body flow passage, said sealing ring being shiftable in said groove by said seating ring and by said plug to seal against leakage past said seating surface when said valve is closed.

3. In a spherical plug valve the combination of a valve body, a body flow passage for the movement of matter through the body, a truncated conical surface formed on the body surrounding the flow passage, a plug rotatable in said body and having a flow passage therethrough, a substantially spherical seat formed on said plug, an annular groove interrupting said conical surface at the point of tangency between said plug and conical surface, a seating ring in said groove and shiftable axially of the body flow passage, a truncated conical seating surface formed on said ring substantially parallel to said body conical surface, and a sealing ring in said groove between said seating ring and the adjacent body flow passage, said sealing ring being formed as a flat annulus of rectangular cross-section and being twisted to form a conical annulus of rectangular cross-section when in the groove and having one of the short sides thereof substantially tangent to the adjacent plug surface and the other short side tending to rotate toward said seating ring.

4. In a spherical plug valve the combination of a valve body, a body flow passage for the movement of matter through the body, a truncated conical surface formed on the body surrounding the flow passage, a plug rotatable in said body and having a flow passage therethrough, a substantially spherical seat formed on said plug, an annular groove interrupting said conical surface at the point of tangency between said plug and conical surface, a seating ring in said groove and shiftable axially of the body flow passage, a truncated conical seating surface formed on said ring substantially parallel to said body conical surface, and a sealing ring in said groove between said seating ring and the adjacent body flow passage, said sealing ring and seating ring mutually interacting and shiftable in the groove to prevent leakage between the body and plug when the valve is closed.

5. In a spherical plug valve the combination of a valve body, a body flow passage for the movement of matter through the body, a truncated conical surface formed on the body surrounding the flow passage, a plug rotatable in said body and having a flow passage therethrough, a substantially spherical seat formed on said plug, an annular groove interrupting said conical surface at the point of tangency between said plug and conical surface, a seating ring in said groove and shiftable axially of the body flow passage, a truncated conical seating surface formed on said ring substantially parallel to said body conical surface, and a sealing ring in said groove between said seating ring and the adjacent body flow passage, said sealing ring and seating ring being spaced from the bottom of the groove and shiftable in the groove whereby pressure exerted on the seating ring by the plug will urge said sealing ring toward the plug.

6. In a spherical plug valve the combination of a valve body, a body flow passage for the movement of matter through the body, a truncated conical surface formed on the body surrounding the flow passage, a plug rotatable in said body and having a flow passage therethrough, a substantially spherical seat formed on said plug, an annular groove interrupting said conical surface at the point of tangency between said plug and conical surface, a seating ring in said groove and shiftable axially of the body flow passage, a truncated conical seating surface formed on said seating ring substantially parallel to said body conical surface, and a sealing ring in said groove between said seating ring and the adjacent body flow passage, said sealing ring projecting inwardly of the conical seating surface of the seating ring and being tensioned by movement of said plug into engagement with said conical seating surface to grip the plug.

7. The structure of claim 6 characterized in that said sealing ring and seating ring are spaced from the bottom of the groove to enclose a compression space whereby axial movement of the seating ring in one direction will force said sealing ring toward the plug and increase the gripping force on said plug.

8. The structure of claim 1 characterized in that said seating ring during axial movement in one direction will rotate said sealing ring to increase the tension of the sealing ring.

9. The structure of claim 1 characterized in that said sealing ring is formed as a flat annulus of rectangular cross-section and is twisted to form a conical annulus of the same cross-section when in the groove and having a restoring tendency rotating the ring in the same direction as the pressure of matter leaking past said seating surface whereby said leakage pressure increases the sealing effect.

10. In a spherical plug valve the combination of a valve body, a body flow passage for the movement of matter through the body, a conical surface formed on the body surrounding the flow passage, a plug rotatable in the body and having a flow passage therethrough, a substantially spherical seat formed on said plug, a groove interrupting said conical surface adjacent the point of tangency between said plug and conical surface, said groove being formed with an outer wall substantially paralleling and concentric with the axis of the body passage, and with a conical inner wall converging toward the plug center, a seating ring mounted in the groove and shiftable along the outer wall axially of the passage, said seating ring being formed with a seating surface adapted to engage the plug seating surface, and a sealing ring mounted in said groove and shiftable along the inner wall angularly toward and away from said outer wall.

11. In a spherical plug valve, a valve body assembly having a flow passage therethrough, a closure having an opening therein for registry with said flow passage, said closure being axially movable into said body at one end of said passage and forming a part of said assembly, a spherical plug rotatably mounted in said body and having a flow passage therethrough, an annular groove formed in the body assembly about the flow passage at each side of said spherical plug, one of said grooves being formed in the inner end of said closure, said grooves each being defined in part by an inwardly converging wall of truncated conical form, and gaskets of cylindrical form having substantially flat side walls and of a width greater than the depth of said converging walls, said gaskets being adapted to be received in said grooves when distorted to conical form and to project therefrom into plug engaging position and being deformable in their own distorted plane by adjusting said closure toward said plug.

12. The structure of claim 11 characterized in that stop means are provided for the closure for regulating the axial pressure of the closure upon the gasket.

References Cited in the file of this patent

UNITED STATES PATENTS

| | | |
|---|---|---|
| 1,008,416 | Lavigne | Nov. 14, 1911 |
| 1,043,065 | Cash | Nov. 5, 1912 |
| 1,575,125 | Nordstrom | Mar. 2, 1926 |
| 1,616,386 | O'Stroske | Feb. 1, 1927 |
| 2,032,623 | Lewis | Mar. 3, 1936 |
| 2,049,805 | Heinen | Aug. 5, 1936 |
| 2,074,091 | MacKinnon | Mar. 16, 1937 |
| 2,225,701 | LeGorre | Dec. 24, 1940 |
| 2,297,161 | Newton | Sept. 29, 1942 |
| 2,373,628 | Gleeson | Apr. 10, 1945 |
| 2,420,047 | Marien | May 6, 1947 |
| 2,516,947 | Blevans | Aug. 1, 1950 |
| 2,517,730 | Sprigg | Aug. 8, 1950 |
| 2,520,288 | Shand | Aug. 29, 1950 |
| 2,533,931 | Hartley | Dec. 12, 1950 |
| 2,665,879 | Housekeeper | Jan. 12, 1954 |

FOREIGN PATENTS

| | | |
|---|---|---|
| 370,228 | Italy | Apr. 11, 1939 |
| 120,400 | Australia | Sept. 24, 1945 |
| 883,374 | Germany | 1953 |